June 7, 1960 R. S. REAVES 2,939,537
LIFT FOR PLANTER MARKER
Filed Jan. 3, 1956 2 Sheets-Sheet 2
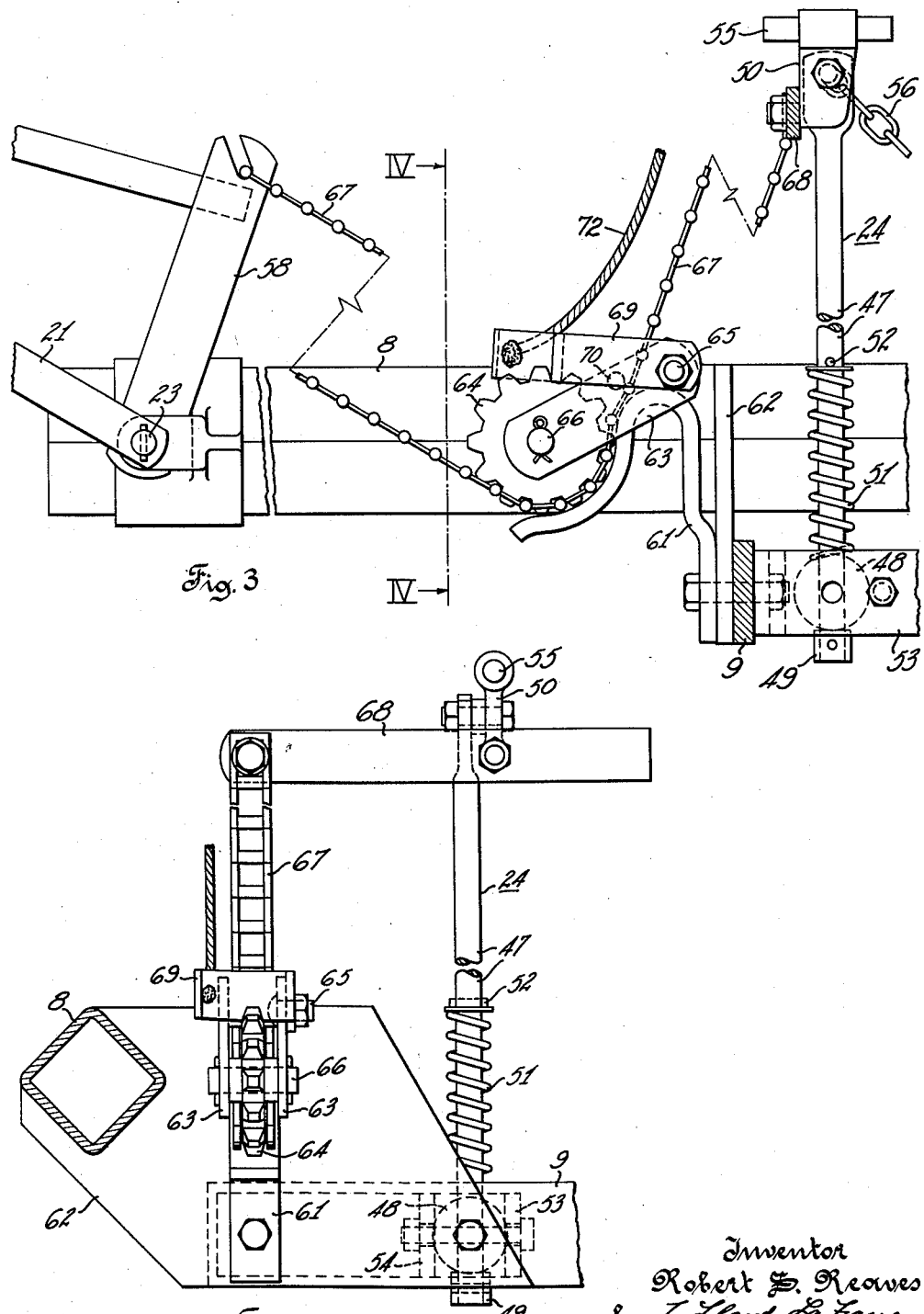
Inventor
Robert S. Reaves
by T. Lloyd LeFane
Attorney

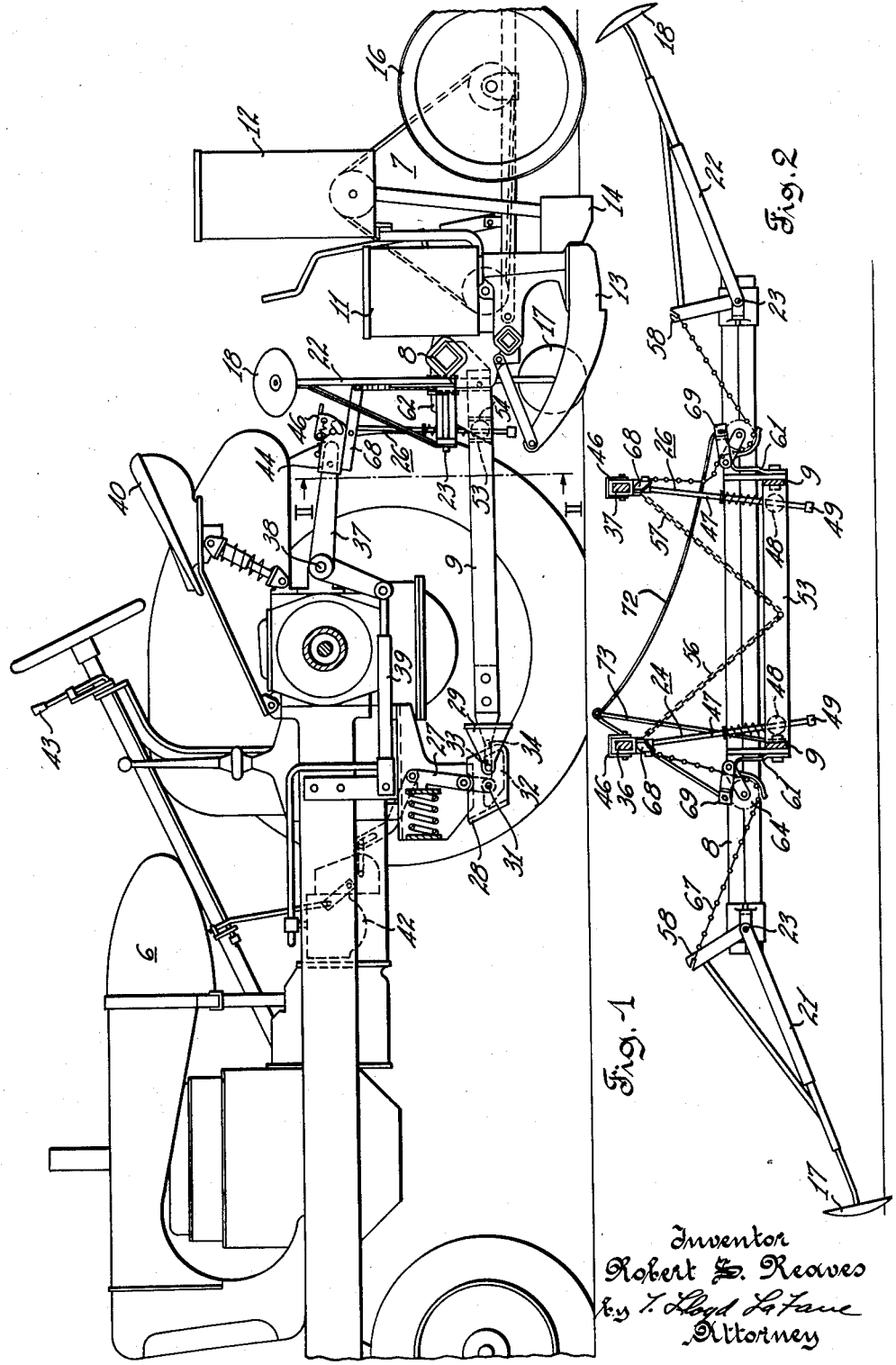

2,939,537

United States Patent Office

Patented June 7, 1960

2,939,537
LIFT FOR PLANTER MARKER

Robert S. Reaves, Waukesha, Wis., assignor to Allis-Chalmers Manufacturing Company, Milwaukee, Wis.

Filed Jan. 3, 1956, Ser. No. 557,143

7 Claims. (Cl. 172—128)

This invention relates to a rear attached tractor carried planter and more particularly to a lift and control mechanism for a marker arm of such planter.

It is an object of the present invention to provide an improved operating and control mechanism for the marker arm of a rear attached tractor carried planter.

Another object of this invention is to provide an economically constructed and easy to operate marker arm operating and control mechanism for a tractor mounted planter.

Another object of this invention is to provide a planter marker arm lifted by a tractor power lift arm through a flexible connection maintained taut for both operative and inoperative positions of the marker arm.

Another object of this invention is to provide a marker arm lift and control structure mounted solely on a rear attached tractor carried planter.

Another object of this invention is to provide a mechanism effective to lift and secure a planter marker to an inoperative position in response to initial movement of tractor power lift arms which subsequently lift the planter.

These and other objects and advantages of the present invention will be apparent upon a reading of the following description with the accompanying drawings, in which:

Fig. 1 is a view in elevation of a tractor and a rear attached tractor mounted planter with the near wheel of the tractor removed and parts in section;

Fig. 2 is a view taken along the lines II—II of Fig. 1 showing the planter frame, marker arms and operating mechanism for lifting and securing the marker arms and omitting the other mechanism of the planter;

Fig. 3 is an enlarged view of a portion of Fig. 2; and

Fig. 4 is a view taken along the lines IV—IV of Fig. 3.

Referring to the drawings, the invention is shown in the combination of a tractor 6 and a rear attached implement such as a planter 7.

The planter comprises a frame including a transverse support bar 8 and pull bar 9 having an A-type frame rigidly connected to bar 8. Fertilizer and seed dispensing mechanism including hoppers 11, 12, furrow openers 13, 14 and a drive wheel 16 for the dispensing mechanism is mounted on the frame in a known manner. Planter markers 17, 18, Fig. 2, are shown as a disk type marker rotatably supported on marker arms 21, 22 which are pivotally mounted on opposite ends of transverse bar 8 by pivots 23 disposed transversely of bar 8 to permit vertical swinging of the marker arms between an operative laterally extending position and a transport and inoperative position. The planter is also provided with lift transmitting members 24, 26 later described in relation to control means for the marker arms.

The tractor 6 is provided with a hitch and power lift system for readily attaching rear mounted implements thereto and for readily detaching such implements from the tractor. The tractor has a single point draft transmitting connection provided by a depending yoke 27 to which a bracket 28 supporting a bell shaped hitch housing 29 is secured by a pivot pin 31. A latch 32 is pivotally supported on pin 31 and biased by a spring, not shown, to swing the latch so that a hook portion 33 of the latch extends through an aperture in the bottom of the bell housing. The latch is shown with the hook portion in draft transmitting engagement with an eye 34 or loop in the forward end of the planter pull bar 9. The latch is manually releasable by means, not shown. The single point draft transmitting connection permits vertical swinging of the planter about the hitch point.

The power lift system of the tractor 6 includes laterally spaced lift arms 36, 37 mounted on a transverse rock shaft 38 actuated by a hydraulic ram 39 connected to a crank arm on rock shaft 38 for vertically swinging the lift arms. The ram receives fluid under pressure from a hydraulic pump 42 with the fluid admitted to the ram controlled by a valve, not shown, manually controlled by a lever 43 from an operator's station 40.

The lift arms 36, 37 each include a bifurcated retainer 44 having upwardly facing pin receiving recesses and an overcenter spring biased latch 46. The lift members 24, 26 are adapted for connection at their upper and lower ends to the lift arms and frame. Each lift member preferably comprises an elongated member such as a rod 47 having a clevis 50 pivotally mounted at its upper end with a stud pin 55 extending transversely through the clevis and arranged so that the stud pin may readily be seated in the recesses provided in the lift arm retainer 44. Each rod 47 is connected to the planter frame through a lost motion connection. The lower end of each rod 47 extends slidably through ball 48 so as to permit relative movement between the planter frame and each rod 47. The end portion of each rod 47 is provided with a suitable stop such as a washer and cotter pin or a flanged end 49, as shown, which abuts the ball 48 to apply lift to the planter frame when the lift arms raise the rods 47 of lift members 24, 26. A light spring 51 is mounted coaxially of rod 47 between ball 48 and a pin stop 52 in rod 47 above ball 48 to urge the rod 47 to a raised position. Balls 48 are seated in spherical recesses in a pair of rigid cross plates 53, 54 extending between side members of an A type frame of pull bar 9 adjacent transverse bar 8. Plates 53, 54 are bolted together to apply clamping pressure on pivot balls 48, which provide a universal pivot support for rods 47.

Chains 56, 57, to limit lateral sway of the planter, are suitably connected between upper clevis portions of the lift members 24, 26 and a bolt extending through midportions of cross plates 53, 54.

The planter marker arms each include a crank arm 58 that is operatively connected by a flexible member, such as a link chain 67, to one of the lift transmitting elements to be raised by the power lift arms. A control means releasably holding the marker arm in any raised inoperative position comprises a wheel element 64 shown as a sprocket wheel rotatably mounted on the planter frame with a lower portion of its toothed periphery in driven engagement with the chain 67; and a further element of the control means includes an intermittent grip device comprising a latch or pawl 69 pivotally mounted to fall into indentation spaces between teeth of the sprocket wheel and releasably secure the sprocket wheel against rotation in a marker arm lowering direction.

A member 61 supports the control means on the planter frame. Support member 61 is bolted to a plate 62 that rigidly connects the pull bar 9 to the transverse bar 8. A pair of spaced sprocket wheel support straps 63 are welded to opposite sides of support member 61. Sprocket wheel 64 is rotatably mounted on a bolt or pin 66 extending through the lower ends of straps 63. A guide for chain 67 comprises a roll pin 70 secured between upper portions of straps 63. Support member 61 has a curved portion that closely underlies the toothed peripheral portion of the sprocket wheel in driven engagement with chain 67 to prevent the chain slipping off the sprocket wheel.

A crank arm 58 on marker arm 21 is connected to one end of a chain 67 and the other end of the chain is connected to a link 68 bolted to the clevis 50 at the upper end of rod 47 of lift member 24. Link 68 has a forwardly extending portion bent to underlie the associated power lift arm to prevent pivoting of the link when the lift arm raises the chain 67 and the marker arm 21. Link 68 also has a rearwardly extending portion which serves effectively to extend the power lift arm. This rearwardly extending portion of link 68, at a point spaced rearwardly of the connection between the lift arm and lift transmitting member 24, is connected to the other end of chain 67.

Pawl 69 is pivotally supported by a bolt 65 to the upper end of a sprocket support strap. The free end of pawl 69 is bent in right angle offset to extend transversely of the sprocket wheel and fall between teeth of the sprocket wheel not engaged by the chain 67. The pawl is constructed and arranged so that rotation of sprocket 64 counterclockwise in Fig. 3, in a direction for raising marker arm 21, causes latch 69 to swing upward and ride the teeth of the sprocket; clockwise rotation, Fig. 3, or rotation in a direction for lowering the marker arm 21 is prevented by latch 69 which swings downward between the teeth. A similar marker arm operating and control means, as provided for marker arm 21, is also provided for marker arm 22.

A rope 72 loosely interconnects latches 69 for both marker arms 21, 22 and a rod 73 is suitably mounted on the frame to hold the loop of the rope in an elevated position where it may be reached by the tractor operator in his operator's station for releasing either of the latches 69 and associated marker arms. Member 61 supports an assembly comprising the sprocket wheel and pawl that may be mounted as a unit on the frame of the tractor.

The light spring 51 holds the lift member from lowering an extent that would produce slack in chain 67 when the associated marker arm is in raised and inoperative position and the planter is in lowered position. Spring 51 thus keeps the chain 67 taut so that the chain will not kink or become entangled with the latch or sprocket.

Upon raising the planter from the lowered operating position shown in Fig. 1 to a transport position by positioning of control lever 43 to supply lifting power to the lift arms, the power lift arms sequentially; first, take up the lost motion in the lift transmitting members thereby raising the lowered marker arm to a first inoperative position; and second, apply lift to the planter, raising it to a transport position while also raising the marker arm further relative to the planter to a second inoperative and transport position. The marker arms may be raised to the first inoperative position without subsequently raising the planter, and for any raised position the latch or pawl 69 releasably secures the marker arm against lowering movement.

Although but one embodiment of the planter marker arm operating and control means has been shown and described, it will be apparent to those skilled in the art that various changes and modifications may be made therein without departing from the scope of the appended claims.

It is claimed and desired to secure by Letters Patent:

1. In a rear attached tractor carried planter, the combination of a planter frame, said frame including a transverse support bar and a pull bar connected with said transverse support bar and extending forwardly therefrom, a hitch element at a forward portion of said pull bar adapted for establishing a vertically swingable draft transmitting connection with the tractor, a pair of laterally spaced elongated lift transmitting members connected to said frame through a lost motion connection and adapted for connection with a pair of power lift arms on the tractor, the lost motion connection of said elongated lift members with said frame providing a predetermined movement of said lift members relative to said frame before transmitting lift to said frame, a marker arm pivotally mounted on an end portion of said transverse support bar for vertical swinging movement of said marker arm between a lowered laterally extending operating position and a raised inoperative position, a flexible member connecting said marker arm to one of said elongated lift members so that the power lift arms in taking up said predetermined lost motion movement of said elongated lift members raise said marker arm to said inoperative position without lifting said frame, and control means for releasably holding said marker arm in said raised inoperative position.

2. In a rear attached tractor carried planter, the combination of a planter frame, said frame including a transverse support bar and a pull bar rigidly connected with said transverse support bar and extending forwardly therefrom, a hitch element at a forward portion of said pull bar adapted for establishing a vertically swingable draft transmitting connection with the tractor, a pair of laterally spaced elongated lift transmitting members connected to said frame through a lost motion connection and adapted for connection with a pair of power lift arms on the tractor, the lost motion connection of said elongated lift members with said frame providing a predetermined movement of said lift members relative to said frame before transmitting lift to said frame, a marker arm pivotally mounted on an end portion of said transverse support bar for vertical swinging movement of said marker arm between a lowered laterally extending operating position and a raised inoperative position, a flexible member connecting said marker arm to one of said elongated lift members so that the power lift arms in taking up said predetermined movement of said elongated lift members raise said marker arm to said inoperative position without lifting said frame, and control means for releasably holding said marker arm in raised inoperative position; said control means comprising a wheel element rotatably mounted on said frame and having a peripheral portion in driven engagement with said flexible member, and an intermittent grip device operatively associated with said wheel element for releasably securing the latter against rotation in marker lowering direction.

3. In a rear attached tractor carried planter, the combination of a planter frame, said frame including a transverse support bar and a pull bar rigidly connected with said transverse support bar and extending forwardly therefrom, a hitch element at a forward portion of said pull bar adapted for establishing a vertically swingable draft transmitting connection with the tractor, a pair of laterally spaced elongated lift transmitting members connected to said frame through a lost motion connection and adapted for connection with a pair of power lift arms on the tractor, the lost motion connection of said elongated lift members with said frame providing a predetermined movement of said lift members relative to said frame before transmitting lift to said frame, a marker arm pivotally mounted on an end portion of said transverse support bar for vertical swinging movement of said marker arm between a lowered laterally extending operating position and a raised inoperative position, a chain connecting said marker arm to one of said elongated lift members so that the power lift arms in taking up said predetermined movement of said elongated lift members raise said marker arm to said inoperative position without lifting said frame, and control means for releasably holding said marker arm in raised inoperative position; said control means comprising a wheel element having radially extending circumferentially spaced teeth in driven engagement with said chain, and an intermittent grip device operatively associated with said wheel element for releasably securing the latter against rotation in a marker arm lowering direction.

4. In a rear attached tractor carried planter, the combination of a planter frame, said frame including a transverse support bar and a pull bar rigidly connected with said transverse support bar and extending forwardly therefrom, a hitch element at a forward portion of said pull bar adapted for establishing a vertically swingable draft transmitting connection with the tractor, a pair of laterally spaced elongated lift transmitting members connected to said frame through a lost motion connection and adapted for connection with a pair of power lift arms on the tractor, the lost motion connection of said elongated lift members with said frame providing a predetermined movement of said lift members relative to said frame before transmitting lift to said frame, a marker arm pivotally mounted on an end portion of said transverse support bar for vertical swinging movement of said marker arm between a lowered laterally extending operating position and a raised inoperative position, a chain connecting said marker arm to one of said elongated lift members so that the power lift arms in taking up said predetermined movement of said elongated lift members raise said marker arm to said inoperative position without lifting said frame, and control means for releasably holding said marker arm in raised inoperative position; said control means comprising a sprocket wheel having radially extending circumferentially spaced teeth with some of said teeth in driven engagement with said chain, and an intermittent grip device comprising a pawl pivotally mounted on said frame so as to fall into spaces between teeth of said sprocket wheel remote from said chain for securing said sprocket wheel against rotation only in a marker arm lowering direction.

5. In a rear attached tractor carried planter, the combination of a planter frame, said frame including a transverse support bar and a pull bar connected with said transverse support bar and extending forwardly therefrom, a hitch element at a forward portion of said pull bar adapted for establishing a vertically swingable draft transmitting connection with the tractor, a pair of laterally spaced elongated lift transmitting members connected to said frame through a lost motion connection and adapted for connection with a pair of power lift arms on the tractor, the lost motion connection of said elongated lift members with said frame providing a predetermined movement of said lift members relative to said frame before transmitting lift to said frame, a marker supporting arm pivotally mounted on an end portion of said transverse support bar for vertical swinging movement of said marker arm between a lowered laterally extending operating position and a raised inoperative position, a chain connecting said marker arm to one of said elongated lift members so that the power lift arms in taking up said predetermined lost motion movement of said elongated members raise said marker arm to said inoperative position without lifting said frame, and control means for holding said marker arm in raised inoperative position, said control means comprising an assembly mounted as a unit on said frame; said unit including a support, a sprocket wheel rotatably mounted on said support with said chain in operative engagement with a peripheral portion of said sprocket wheel, said support having a guide portion extending circumferentially about the peripheral portion of said sprocket engaged by said chain to prevent said chain slipping off said sprocket wheel, and a pawl pivotally mounted on said support and continuously engaging another peripheral portion of said sprocket wheel to automatically secure said sprocket against rotation only in a marker arm lowering direction, and means for releasing said pawl from locking engagement with said sprocket wheel.

6. In a rear attached tractor carried planter, the combination of a planter frame, said frame including a transverse support bar and a pull bar connected with said transverse support bar and extending forwardly therefrom, a hitch element at a forward portion of said pull bar adapted for establishing a vertically swingable draft transmitting connection with the tractor, a pair of laterally spaced lift transmitting members connected to said frame through a lost motion connection and adapted for connection with a pair of power lift arms on said tractor, said power lift arms taking up said lost motion before applying lift to said planter when said planter is in lowered operating position, a link mounted on one of said lift transmitting members adjacent its associated power lift arm and extending rearwardly therefrom to serve as an extension of the lift arm, a marker arm pivotally mounted on an end portion of said transverse support for vertical swinging movement of said marker arm between a lowered laterally extending operative position and raised inoperative positions, a chain connecting said marker arm to said link at a point spaced rearwardly of the connection of the associated lift transmitting member and lift arm so that said power lift arms in taking up the lost motion of the lift transmitting members raise said marker arm to a first inoperative position before applying lift to said planter and continue to raise said marker arm relative to said planter to a second inoperative position upon lifting of said planter, and control means for releasably holding said marker arm only against lowering movement from said raised inoperative positions.

7. In a rear attached tractor carried planter, the combination of a planter frame, said frame including a transverse support bar and a pull bar connected with said transverse support bar and extending forwardly therefrom, a hitch element at a forward portion of said pull bar adapted for establishing a vertically swingable draft transmitting connection with the tractor, a marker arm pivotally mounted on an end portion of said transverse support bar for vertical swinging movement of said marker arm between a lowered laterally extending operative position and a raised inoperative position, a member connected to said marker arm and to said power lift arms on the tractor, said member transmitting movement of said power arm to said marker arm, said power arms moving from a lowered position through a predetermined initial upward swinging movement and moving said member and in turn said marker arm from said lowered operative position to said raised inoperative position, and a pair of laterally spaced lift transmitting members, each having lower and upper ends, and each connected at its lower end to said frame through a lost motion connection, and each connected at its upper end to one of said power lift arms to transmit movement of said power lift arms to said frame, said lost motion connections permitting said lift transmitting member to move relative to said frame during said predetermined initial upward swinging movement of said power lift arms without transmitting lift to said frame.

References Cited in the file of this patent

UNITED STATES PATENTS

| | | |
|---|---|---|
| 902,128 | Youtz | Oct. 27, 1908 |
| 2,178,124 | Robinson | Oct. 31, 1939 |
| 2,222,115 | Mott | Nov. 19, 1940 |
| 2,352,491 | Orelind | June 27, 1944 |
| 2,604,027 | Hansen | July 22, 1952 |
| 2,657,623 | Allen | Nov. 3, 1953 |
| 2,688,908 | Reaves | Sept. 14, 1954 |